Aug. 11, 1964 J. H. PERRY 3,144,614

SYNCHRONIZING THE STATES OF A BISTABLE
MULTIVIBRATOR TO HIGH AND LOW
AMPLITUDE PULSES

Filed March 23, 1960

INVENTOR.
Jack H. Perry
BY
Paul J. Ethington
ATTORNEY

United States Patent Office 3,144,614

Patented Aug. 11, 1964

3,144,614

SYNCHRONIZING THE STATES OF A BISTABLE MULTIVIBRATOR TO HIGH AND LOW AMPLITUDE PULSES

Jack H. Perry, Flint, Mich., assignor to General Motors Corporation, Detroit, Mich., a corporation of Delaware Filed Mar. 23, 1960, Ser. No. 16,995
6 Claims. (Cl. 328—206)

This invention relates to a trigger circuit adapted for synchronizing a switching circuit.

It is often necessary to synchronize a multivibrator or other switching device with a signal such as a pulse train in such a way that one of the stages of the switching device will be driven into conduction upon the occurrence of a signal of a particular character. If the signal includes, for example, pulses of alternate high and low amplitude, then it may be desirable to synchronize a bistable multivibrator with the signal such that one particular stage will be driven into conduction by each high amplitude pulse while the other stage will be driven into conduction by each low amplitude pulse.

The principal object of this invention is to provide an improved trigger circuit that is adapted to synchronize an electrical switching circuit with an input signal which has a particular character. Another object is to provide a dual channel triggering circuit for a multivibrator wherein the two channels have different signal transfer characteristics.

In accordance with this invention, a switching circuit such as a bistable multivibrator is utilized wherein two stages are adapted to switch between conduction and non-conduction in response to pulses applied to a pair of inputs. A triggering circuit is connected to the two inputs and includes a separate channel for each input. One of the channels is adapted to pass all of the input signals while the other channel includes means such as a pulse height discriminator such that it will pass only signals having a predetermined character. Thus if an input signal is applied to the triggering circuit wherein two distinct signals are alternately present and the discriminating means is adapted to distinguish between the two different signals, then all the signals will be applied to one input and only one type of signal will be applied to the other input. This will result in a condition of operation wherein one stage of the switching circuit or multivibrator will always be synchronized with signals of one character.

The novel features which are believed to be characteristic of the invention are set forth with particularity in the appended claims. The invention itself, however, both as to its organization and method of operation, together with further objects and advantages thereof, may best be understood by reference to the following description, taken in conjunction with the accompanying drawing, in which:

Figure 1:
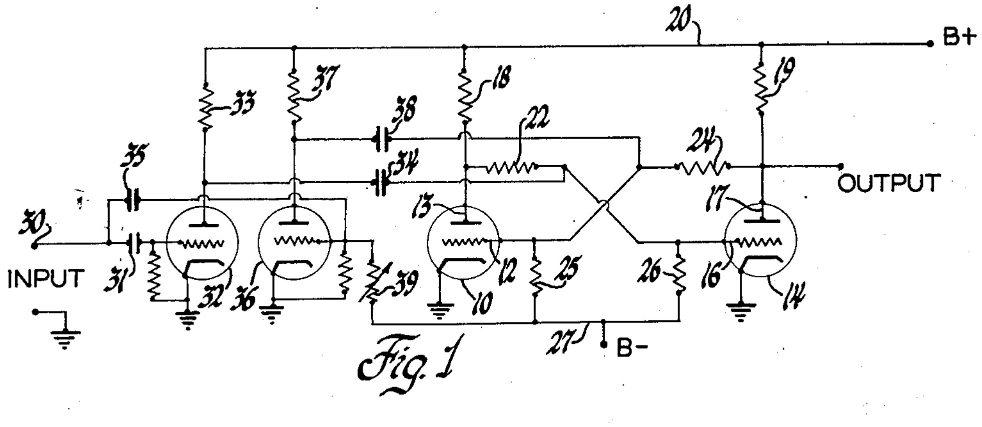
FIGURE 1 is a schematic diagram of a circuit incorporating the principal features of the invention.

With reference to FIGURE 1 of the drawing, a multivibrator of the bistable configuration is shown including a first amplifier tube 10 having a cathode, a grid 12, and a plate 13 and also a second amplifying tube 14 having a cathode, a grid 16, and a plate 17. The plates 13, 17 are connected through a pair of load resistors 18 and 19 to a positive voltage supply line 20. The plates and grids of the tubes 10, 14 are interconnected by a pair of coupling resistors 22 and 24. The grids 12 and 16 are further connected by a pair of biasing resistors 25 and 26 to a negative voltage supply line 27.

A triggering circuit including two separate channels is provided for driving the grids 12 and 16 in response to an input signal which is applied between an input terminal 30 and ground. The input signal is coupled by a capacitor 31 to the grid of a first trigger amplifying tube 32. The plate of the tube 32 is connected through a load resistor 33 to the supply line 20 and the voltage appearing across this load resistor is coupled by a capacitor 34 to the grid 16. The input terminal 30 is further connected by a coupling capacitor 35 to the grid of a second trigger amplifying tube 36. The plate of this tube is also connected to the supply line 20 through a load resistor 37 and the voltage across this resistor is coupled by a capacitor 38 to the grid 12. The grid of the tube 36 is maintained at a predetermined negative bias level by means which may include a variable resistor 39 which is connected to the negative voltage supply line 27.

Figure 3:
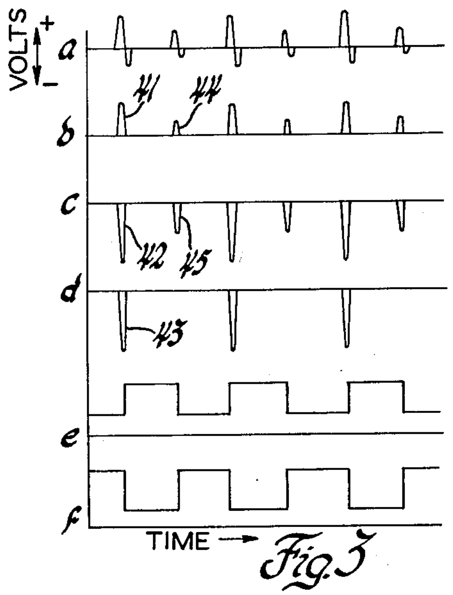
FIGURE 3 is a graphic representation of voltage waveforms appearing at various points in the circuits of FIGURES 1 and 2.

In the operation of the circuit shown in FIGURE 1, the bistable multivibrator circuit including the tubes 10 and 14 will remain in one of two stable conductive conditions until a negative voltage spike is applied to the grid of the conducting tube. At this time the conductive conditions will switch and the circuit will change to the other stable operating condition. If there is applied to the input terminal 30 a signal which is in the form of a series of positive pulses of alternately high and low amplitude such as is shown in FIGURE 3*b*, then the signal applied to the grid 16 will be a series of negative voltage spikes such as is shown in FIGURE 3*c* since the trigger tube 32 will merely amplify and invert all of the input pulses. The trigger tube 36 however, being biased at some negative value, will be non-responsive to signals having an amplitude below a given level. Unless the input pulse to the tube 36 is positive and great enough to cause the tube to conduct, then there will be no output spike present at the plate. Since the smaller signals of FIGURE 3*b* are below this given level, there will be applied to the grid 12 a series of negative voltage spikes such as is shown in FIGURE 3*d*. Any of the voltage spikes shown in FIGURES 3*c* and 3*d* applied to the grids 12 and 16 are capable of cutting off the tubes 10 and 14 if they are, at the time, conducting.

If the signal of FIGURE 3*b* is initiated at the time when the tube 10 is conducting and the tube 14 is cut off, then the first pulse, which is in this case a high amplitude pulse 41, will appear as a negative voltage spike 42 at the grid 16 and as a negative spike 43 at the grid 12. This will not affect the tube 14 which is already cut off, but it will cut off the tube 10 which in turn will result in the conduction of the tube 14. The next input pulse, being a low amplitude pulse 44, will appear on the grid 16 as a negative voltage spike 45, but will not appear on the grid 12 due to the discriminating action of the tube 36. Thus, the multivibrator circuit will switch back to the original condition wherein the tube 10 is conducting and tube 14 is cut off and this cycle will repeat, resulting in a voltage appearing on the plate of the tube 10 as is shown in FIGURE 3*e* and a voltage appearing on the plate of the tube 14 as shown in FIGURE 3*f*. Thus, a square wave output may be obtained from the plate 17 of the tube 14 wherein the positive-going step is always synchronized with the low amplitude pulses and the negative going step with the high amplitude pulses.

Figure 4:
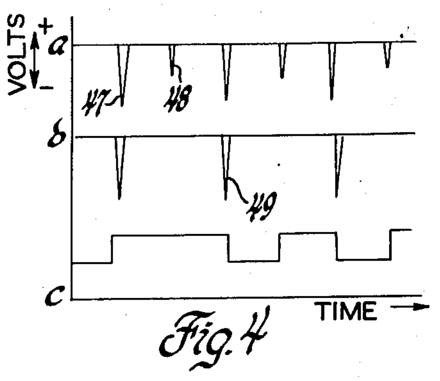
FIGURE 4 is a graphic representation of voltage waveforms appearing in the circuits of FIGURES 1 and 2 upon the occurrence of a modified input.

If the input signal is initiated at a time when the tube 10 is cut off and the tube 14 is conducting, then the first input pulse, in this case a high amplitude pulse resulting in a spike 47 on the grid 16 as shown in FIGURE 4*a*, will cut off the tube 14 and the tube 10 will start conducting. The next pulse, a low amplitude pulse resulting in a negative spike 48 at the grid 16, would not appear at the grid 12. This would not disturb the conductive conditions of the multivibrator since the negative voltage spike on the grid of the tube 14 which is already cut off would have no effect on the conduction thereof and since no signal appears on the grid of the tube 10 which is conducting. The next pulse, being of high amplitude, would appear at the grid 16 and also as a spike 49 at the grid 12 as shown in FIGURE 4*b* and so would cut off the tube 10 and cut on the tube 14. Thereafter, the circuit would function in the desired manner as shown in FIGURE 4*c* which represents the voltage appearing at the plate 17 of the tube 14. The circuit of FIGURE 1 will always be synchronized in such a manner that the tube 10 will cut off upon the occurrence of a high amplitude pulse and the tube 14 will cut off on the occurrence of a low amplitude pulse.

Figure 2:
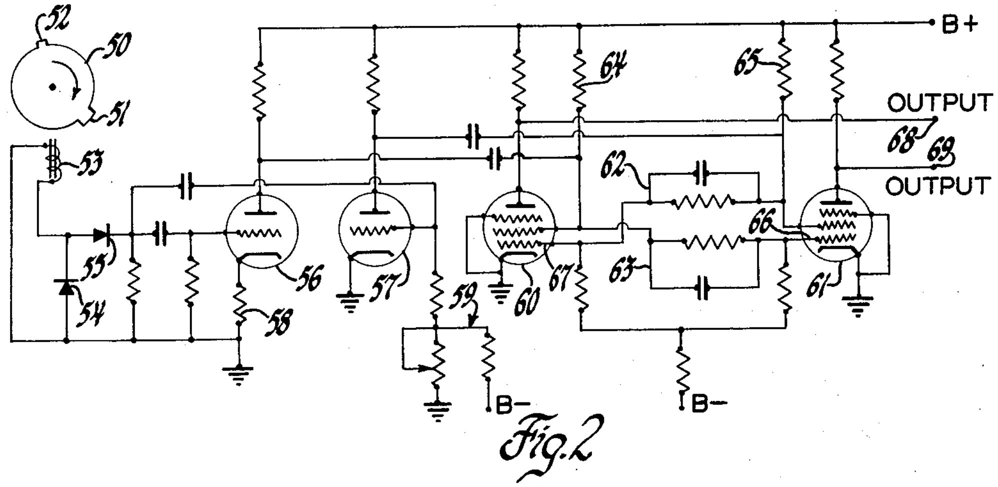
FIGURE 2 is a schematic diagram of a modification of the circuit of FIGURE 1.

In FIGURE 2 there is shown an embodiment of the invention utilizing pentode amplifier tubes in the multivibrator stages. This circuit is adapted to be synchronized with a rotating member 50 having a pair of lugs 51 and 52 of different sizes so that there will be a difference in spacing between the lugs and a magnetic pickup 53 which is positioned near the rotating member 50. Thus electrical signals as shown in FIGURE 3*a* will be produced by the magnetic pickup, the large signals corresponding to the lug 51 and the small signals corresponding to the passage of lug 52. The pickup 53 is connected to a pair of diodes 54, 55 which remove negative excursions of the pickup output to provide a signal resembling that shown in FIGURE 3*b*. This signal is applied to the grids of a pair of trigger amplifying stages 56, 57 which correspond to the tubes 32, 36 and associated circuitry of FIGURE 1. A cathode resistor 58 is included in the circuit of the stage 56 to provide degeneration so that the output of both stages will be of the same magnitude. The stage 57, like the circuit of the tube 36 of FIGURE 1, includes a biasing network 59 which is adapted to maintain the stage non-responsive to the pulses of low amplitude corresponding to the lug 52 such as the pulse 44 of FIGURE 3*b*.

The outputs of the stages 56, 57 in the form of pulses as shown in FIGURES 3*c* and 3*d*, respectively, are applied to the inputs of a bistable multivibrator which utilizes a pair of pentode stages 60, 61. The cathode, control grid, and screen grid of each pentode form an amplifying stage of the multivibrator circuit. The bistable switching action is provided by a pair of cross coupling circuits 62, 63 which are connected between a pair of screen load resistors 64, 65 and the opposing grids 66, 67. Although the trigger signals from the stages 56, 57, in the form of negative voltage spikes, are applied to the screen grids of the pentodes 60, 61, the signals are not sufficient to alter the conductive conditions of the pentodes by way of the screen grids. These trigger signals are applied to the control grids 66, 67 by the coupling circuits 63, 62, respectively. Thus, the signals from the plate of the stage 56, including negative spikes of both large and small amplitude as shown in FIGURE 3*c*, are applied through the coupling circuit 63 to the grid 66 and are effective to cut off the pentode 61 when it is conducting. From the plate of the stage 57, the large amplitude negative spikes alone, as shown in FIGURE 3*d*, reach the grid 67 through circuit 62, and so the stage 60 is affected only by the high amplitude pulses as shown by the spike 43.

The screen, suppressor, and plate of each pentode stage 60 and 61 form additional amplifier stages and serve to increase the level of the square wave output and also to isolate the output load from the bistable switching circuit. The circuit output may be taken from either plate, depending upon whether positive-going or negative-going square wave signals are desired.

The operation of the circuit shown in FIGURE 2 is similar to that of FIGURE 1. When the lug 51 passes the pickup 53, a signal is generated which, when rectified, results in a pulse 41 at the input to both the stages 56, 57.

This causes a negative voltage spike 42 to be applied to the grid 66 and a spike 43 to be applied to the grid 67, thus cutting off whichever of the stages 60, 61 is conducting. Subsequently, the lug 52 causes a smaller amplitude pulse 44 to be presented to the inputs of the stages 56, 57. This will result in a negative spike 45 being presented to the grid 66, but since the pulse 44 is below the level established between biasing network 59, the stage 57 will be non-responsive to this pulse and no negative spike will be presented to the grid 67. Thus, if the stage 61 had been conducting, it would now be cut off, but if the stage 60 had been conducting, the conductive conditions of the multivibrator would not be changed. As described above in relation to FIGURE 1, it is seen that the circuit will always synchronize itself such that the stage 60 will be cut off by the large amplitude pulses corresponding to the lug 51. The stage 61 will always be cut off by the small amplitude pulses corresponding to the lug 52. Appearing at an output terminal 68 will be a square wave as shown in FIGURE 3*e* while at a terminal 69 will be a square wave as shown in FIGURE 3*f*.

While the invention has been described in terms of the two circuits set forth above, it will of course be understood that various modifications may be made by those skilled in the art, and it is contemplated that the appended claims will cover any such modifications as fall within the true scope of the invention.

I claim:

1. Signal processing apparatus comprising a bistable multivibrator having first and second stages and inter-coupling circuits to provide bistable switching action, a signal source adapted to produce electrical signals of a first character and of a second character in alternate succession, first coupling means connecting said signal source to said first stage such that signals of both first and second character are applied to said first stage, and second coupling means including signal discriminator means connecting said signal source to said second stage such that only signals of said first character are applied to said second stage, said discriminator means being adapted to block signals of said second character, thereby synchronizing the bistable switching action in a particular phase relation with the electrical signals produced by said signal source.

2. In combination, a multivibrator comprising a first stage having an input and an output, a second stage having an input and an output, resistance coupling means for connecting the output of said first stage to the input of said second stage and for connecting the output of said second stage to the input of said first stage such that bistable switching action will result, a source adapted to produce electrical pulses of a first character alternately with electrical pulses of a second character, first coupling means connecting said source to the input of said first stage such that pulses of both first and second character will be applied to said first stage, second coupling means including a pulse discriminator connecting said source to the input to second stage, said pulse discriminator being adapted to block pulses of said second character, thereby synchronizing the bistable switching action in a particular phase relation with the electrical pulses produced by said source.

3. In combination, a multivibrator comprising a first stage having an input and an output, a second stage having an input and an output, resistance coupling means for connecting the output of said first stage to the input of said second stage and for connecting the output of said second stage to the input of said first stage such that bistable switching action will result, a source adapted to produce electrical pulses of a given height alternately with electrical pulses of a lower height, first coupling means connecting said source to the input of said first stage such that all of said electrical pulses will be applied to said first stage, second coupling means including a pulse height discriminator connecting said source to the input to said second stage, said pulse height discriminator being adapted to block pulses of said lower height, thereby synchronizing the bistable switching action in a particular phase relation with the electrical pulses produced by said source.

4. In combination, an electrical switching circuit having first and second inputs and first and second conductive conditions, said switching circuit being adapted to switch from said first conductive condition to said second conductive condition upon the occurrence of a pulse at said first input and adapted to switch from said second conductive condition to said first conductive condition upon the occurrence of a pulse at said second input, first means developing pulses of a first character connected to said first input, and second means developing pulses coincident with said pulses of said first character alternately with pulses of a second character, said second means being connected to said second input whereby said switching circuit will always switch from said first conductive condition to said second conductive condition upon the occurrence of a pulse of said first character and will always switch from said second conductive condition to said first conductive condition upon the occurrence of a pulse of said second character.

5. In combination, an electrical switching circuit having first and second inputs and first and second conductive conditions, said switching circuit being adapted to switch from said first conductive condition to said second conductive condition upon the occurrence of a pulse at said first input and adapted to switch from said second conductive condition to said first conductive condition upon the occurrence of a pulse at said second input, first means developing pulses of a given height being connected to said first input, and second means connected to said second input and adapted to develop pulses coincident with said pulses of said given height alternately with pulses of a lower height, whereby said switching circuit will always switch from said first conductive condition to said second conductive condition upon the occurrence of a pulse of said given height and will always switch from said second conductive condition to said first conductive condition upon the occurrence of a pulse of said lower height.

6. In combination, a multivibrator circuit having first and second inputs and first and second stable conductive conditions, said multivibrator circuit being adapted to switch from said first conductive condition to said second conductive condition upon the occurrence of a pulse at said first input and adapted to switch from said second conductive condition to said first conductive condition upon the occurrence of a pulse at said second input, first means developing pulses of a given height connected to said first input, and second means connected to said second input and adapted to develop pulses coincident with said pulses of said given height alternately with pulses of a lower height, whereby said multivibrator circuit will always switch from said first conductive condition to said second conductive condition upon the occurrence of a pulse of said given height and will always switch from said second conductive condition to said first conductive condition upon the occurrence of a pulse of said lower height.

References Cited in the file of this patent

UNITED STATES PATENTS

| | | |
|---|---|---|
| 2,549,071 | Dusek et al. | Apr. 17, 1951 |
| 2,880,317 | Vaughan | Mar. 31, 1959 |
| 2,883,525 | Curtis | Apr. 21, 1959 |
| 3,028,558 | Foglia | Apr. 3, 1962 |

OTHER REFERENCES

"Pulse and Digital Circuits," Millman and Taub, McGraw-Hill Book Co., Inc., 1956, page 162, Fig. 5.14c relied on.